United States Patent

Kawai

[11] Patent Number: 6,108,387
[45] Date of Patent: Aug. 22, 2000

[54] AFC CIRCUIT FOR A FREQUENCY SCANNING RECEIVER

[75] Inventor: Kazuo Kawai, Tokyo, Japan

[73] Assignee: General Research of Electronics, Inc., Tokyo, Japan

[21] Appl. No.: 08/988,305

[22] Filed: Dec. 10, 1997

[30] Foreign Application Priority Data

Oct. 2, 1997 [JP] Japan .................................... 9-286031

[51] Int. Cl.$^7$ .................................................. H04L 27/06
[52] U.S. Cl. ........................ 375/344; 375/316; 455/192.2; 455/136
[58] Field of Search ................................. 375/316, 344, 375/346, 324, 325, 326, 327; 455/131, 134, 135, 147, 164.1, 164.2, 161.1, 182.2, 192.2, 226.1

[56] References Cited

U.S. PATENT DOCUMENTS

| | | |
|---|---|---|
| 4,955,083 | 9/1990 | Phillips et al. .............................. 455/47 |
| 5,263,195 | 11/1993 | Panther et al. ........................... 455/316 |
| 5,717,721 | 2/1998 | Kawai ...................................... 375/326 |
| 5,822,373 | 10/1998 | Addy ........................................ 375/259 |

*Primary Examiner*—Chi H. Pham
*Assistant Examiner*—Emmanuel Bayard
*Attorney, Agent, or Firm*—Trexler, Bushnell, Giangiorgi & Blackstone, Ltd.

[57] ABSTRACT

In a frequency scanning receiver having an AFC function, when a desired signal is caught by frequency scanning due to VCO, to which a scanning voltage from a scanning signal oscillator is applied, the scanning is stopped. At this time, an operating circuit calculates to form a setting voltage of the VCO at the convergence of the AFC, based on two voltages, which are the control voltage (scanning voltage) applied to the VCO and an output voltage of a frequency error detector, and the AFC circuit is made function after having applied this setting voltage to the VCO.

In this way, it is possible to shorten a header of a packet signal and to improve through-put of data, which can be transmitted, by removing a remaining frequency error in a short period of time, when the frequency scanning is stopped, by the fact that an object signal is caught by the frequency scanning.

1 Claim, 2 Drawing Sheets

AFC CIRCUIT FOR A FREQUENCY SCANNING RECEIVER

FIELD OF THE INVENTION

The present invention relates to an improvement of a receiver for data signals having a frequency scanning function and an AFC (Automatic Frequency Control) function and in particular to circuit constructing techniques for stopping frequency scanning, when an object signal is caught by frequency scanning at the beginning of reception and at the same time for improving response time of an AFC circuit, when a function is switched-over so that the AFC circuit becomes valid.

DESCRIPTION OF THE PRIOR ART

Data signals have usually a packet structure. A receiver receiving data signals having this packet structure is usually so constructed that frequency scanning is started, in case where there are no frequencies of object signals in the IF (Intermediate Frequency) band and when an object signal is caught by this frequency scanning, the frequency scanning is stopped, and that at the same time the frequency scanning function is switched-over to the AFC function so that the AFC circuit becomes valid. In almost all the prior art receivers for data signals, since a frequency error still remains, when this switching-over has been effected, they are so constructed that they operate so that this frequency error is removed thereafter by the function of the AFC circuit. Since a period of time necessary for finishing correction of this remaining frequency error is determined by response characteristics themselves, which the AFC circuit itself has, the length of a synchronizing signal put at the beginning of a packet is set, taking the response time of the AFC circuit into account.

As described above, since the length of the synchronizing signal is set, taking the response time of the AFC circuit into account, by the prior art techniques, it is tied to increase of through-put of transmitted data that this period of time necessary for the synchronization can be shortened.

Therefore, in order to shorten the length of the synchronizing signal, it is sufficient that it is possible to set an AFC system in a converged state thereof as soon as possible after a desired signal has been caught.

In other words, the point described above can be expressed as follows:

In a frequency scanning receiver having an AFC function, when an object signal is caught by the frequency scanning, if the AFC function is switched-on as it is, in almost all the cases, it is caught not at the center of the IF band of an IF filter but there are the remaining frequency error. Consequently a period of time necessary for removing the error by moving the signal to the center of the IF filter is determined primarily by the response characteristics of the IF filter. The response characteristics of the AFC circuit are preferably not quick-responsive from the point of view of stability of the control. On the other hand, it is a matter of course that they are preferably quick-responsive at the first catch of the signal. These two requirements are contradictory to each other.

SUMMARY OF THE INVENTION

Therefore, it is desired to adopt, a method for effecting such an operation that, when a signal is caught, a tuning frequency is converged in an extremely short time regardless of the response characteristics of an AFC circuit and the AFC circuit is made valid thereafter.

An object of the present invention is to provide an AFC circuit for a frequency scanning receiver capable of adopting the method described above.

In order to achieve the above object, an AFC circuit for a frequency scanning receiver according to the present invention comprising a voltage controlled oscillator for generating a frequency scanning signal; a frequency converter for generating an intermediate frequency signal including a frequency error signal obtained from a received signal and the frequency scanning signal; a frequency discriminator for detecting the frequency error signal; and a signal detector for judging presence or absence of a desired received signal in an output of a signal intensity indicator obtained from a detection output of the frequency discriminator or an intermediate frequency amplifier section, in which a control voltage is given to the voltage controlled oscillator by a judgment output of the signal detector to stop the scanning, according to the present invention is characterized in that it comprises further an operating circuit, which calculates a voltage for setting the frequency at convergence of the AFC circuit, based on the frequency error signal and the control signal, and control means constituting an AFC loop by applying an output of the operating circuit to the voltage controlled oscillator.

The AFC circuit for a frequency scanning receiver comprises a voltage controlled oscillator (VCO) for generating a frequency scanning signal; a frequency converter for generating a frequency error signal obtained from a received signal and the frequency scanning signal; a frequency discriminator for detecting the frequency error signal; and a signal detector for judging presence or absence of a desired received signal in an output of a signal intensity indicator obtained from a detection output of the frequency discriminator or an intermediate frequency amplifier section, and it is so constructed that a control voltage is given to the voltage controlled oscillator, depending on a judgment output of the signal detector to stop the frequency scanning.

Consequently, in order to achieve the object of the present invention, it is sufficient to add an operating circuit as described below thereto.

That is, the frequency scanning is stopped, when an object signal is caught by the frequency scanning. Since a driving voltage of the VCO just before this scanning is stopped and a frequency error voltage generated in the output of the frequency discriminator at the same point of time can be stored temporarily, a true frequency error of the received signal can be known, based on these two voltages, a modulation sensitivity of the VCO, which is previously known, and an error detecting sensitivity of the frequency discriminator. Once this frequency error is known, the AFC should be converged at a point obtained by correcting this frequency error by a factor of 1 divided by (1+loop gain). The driving voltage of the VCO for obtaining this convergence value can be formed by calculation using a weight determined by the stored two voltages, i.e. the driving voltage of the VCO just before the scanning stop and the error voltage in the output of the discriminator, the modulation sensitivity and the error detection sensitivity. Therefore, it is sufficient to effect this calculation, when the object signal is caught and the scanning is stopped, to set the VCO at a frequency at the convergence of the AFC and to construct the AFC loop thereafter.

As a mode of realization of the AFC circuit for a frequency scanning receiver according to the present invention, on the basis of the items described above, concretely speaking, a circuit executing operations as described below is added thereto.

It is recognized by a signal detecting function that the object signal has been caught. There are known methods for doing said function. One of them is to judge presence or absence of a signal by utilizing noise outside of the band in the output of the frequency discriminator (called also Carrier Detection CD method or Squelch SQ Method) and the other is to judge presence or absence of the object signal by using an RSSI (Received Signal Strength Indicator) current, which is proportional to a signal strength obtained from an IF amplifier. For the present invention it is a matter of course that either method can be used, if presence or absence of the signal can be detected, and a circuit used therefor is called a signal detecting circuit. Hereinbelow a case where the former detecting method is used will be explained. The frequency scanning is effected usually by applying a scanning voltage to the voltage controlled oscillator VCO acting as a frequency converting local oscillator, which is a constituent element of the AFC circuit. It is assumed that free-run frequency errors of the VCO and frequency errors of the frequency error detector are negligibly small and that there is a frequency error only in the received frequency. It is supposed also that, when the signal is caught by the frequency scanning of the VCO and the signal detecting circuit responds thereto, the VCO is controlled so as to be displaced from the free-run frequency by $f_{VCO}=e_2k_2$ ($e_2$ being a voltage (V) applied to the VCO, $k_2$ being a frequency control sensitivity (Hz/V)) and that $e_1(V)$ is produced in the output of the frequency error detector (frequency discriminator). Since the error in the IF frequency, which is an input signal to the frequency error detector, can be represented by $f_{IF}=f_{RCV}-f_{VCO}=e_1/k_1$ ($k_1$ being a frequency error detecting sensitivity (V/Hz)), in a state where the AFC controls $f_{VCO}$ so that $e_1(V)$, i.e. $f_{IF}$, is decreased and is converged, the VCO is displaced by a frequency, which is approximately equal to the frequency error of $f_{RCV}$ and finally it is controlled so that the remaining frequency error is $f_{RCV}/(1+k_1k_2k_3)$ ($k_3$ being a gain of elements contributing to the loop gain other than $k_1$, $k_2$, e.g. an active filter, etc.). Further, since the loop gain is set usually at a great value in order to decrease the remaining error, $1 << k_1k_2k_3$. At this time, $1+k_1k_2k_3 \approx k_1k_2k_3$. In this converged state the VCO is controlled so as to be displaced by $f_{RCV}-(f_{RCV}/(1+k_1k_2k_3)) \approx f_{RCV}$ as a frequency, as described above, and the IF frequency error is compressed to $f_{RCV}/(1+k_1k_2k_3)$.

Consequently the object of the present invention can be achieved by finding a control voltage for displacing the VCO by $F_{RCV}$ as soon as possible, starting from the condition (values of $e_1$ and $e_2$) when the signal is caught. A relationship valid between the different frequencies at the moment where the object signal is caught is $f_{RCV}=f_{IF}+f_{VCO}$, as described above. Substituting the respective relationship with the voltage described above for $f_{VCO}$ and $f_{IF}$, $f_{RCV}=(e_1/k_1)+e_2k_2$ is obtained. In order to displace the VCO by this amount, a voltage, which is a product of this frequency multiplied by $1/k_2$, i.e. a voltage of $(e_1/k_1k_2)+e_2$ may be applied to the VCO. If this voltage is applied through a loop filter (LPF) having a gain of $k_3$, a voltage of $(e_1/k_1k_2k_3)+(e_2/k_3)$ may be applied to the input of the loop filter. Therefore it is sufficient that a voltage of $(e_1/k_1k_2k_3)+(e_2/k_3)$ is formed, using $e_1$ and $e_2$ at the moment where the signal detector responds, that at the same time a scanning circuit is disconnected and the voltage is applied to the VCO through the loop filter, and that the AFC loop is formed at the same time as the VCO is at $f_{RCV}$, which is the frequency of the object signal.

DESCRIPTION OF THE PREFERRED EMBODIMENTS

Figure 1:
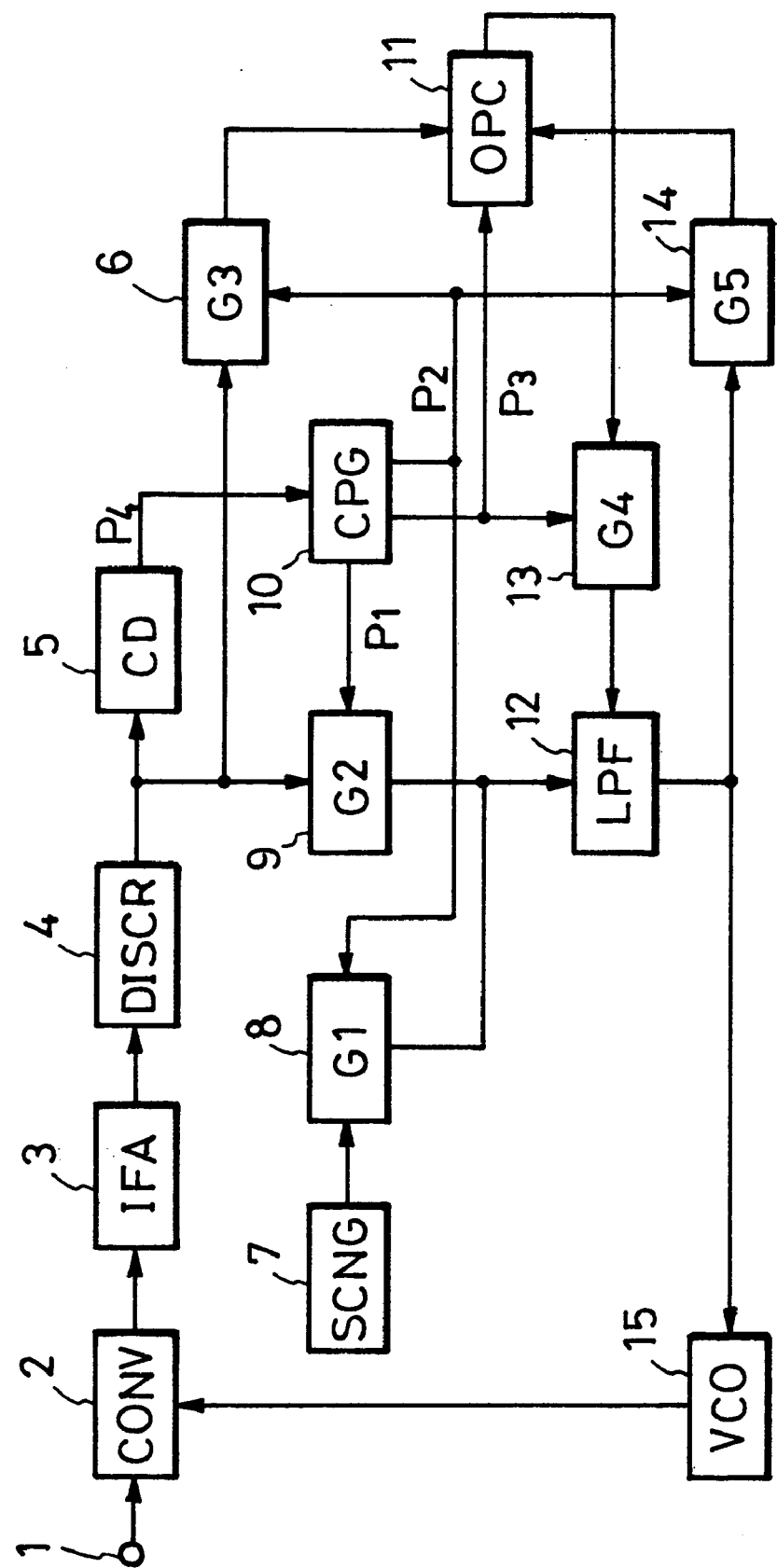
FIG. 1 is a circuit system diagram showing an embodiment of the present invention.

Hereinbelow construction and operation of an embodiment of the present invention will be explained, referring to the drawings. FIG. 1 is a circuit system diagram showing an embodiment of the present invention. In FIG. 1, reference numeral 1 is a received signal input terminal; 2 is a frequency converter CONV; 3 is an intermediate frequency amplifier IFA having an amplitude limiter; 4 is a frequency discriminator DISCR acting as a frequency error detector; 5 is a signal detector CD; 6 is a gate circuit G3; 7 is a scanning signal generator SCNG; 8 is a gate circuit G1; 9 is a gate circuit G2; 10 is a control pulse generator CPG; 11 is an operating circuit OPC; 12 is a loop filter LPF; 13 is a gate circuit G4; 14 is a gate circuit G5; and 15 is a voltage controlled oscillator VCO. The gate circuits G1 to G5 are of course gate circuits for analogue signals such as analogue switches, etc.

The received signal is applied to the frequency converter CONV 2 through the received signal input terminal 1 and converted in frequency into an IF signal by a local carrier (frequency scanning signal) coming from the voltage controlled oscillator VCO 15. The frequency error $f_{RCV}$ of the received signal is corrected by an amount of a deviated frequency $f_{VCO}$ of the local carrier and the received signal is converted into an IF signal having a frequency $f_{IF}$. This is $f_{IF}=f_{RCV}-f_{VCO}$. This IF signal is amplified by the intermediate frequency amplifier IFA3, subjected to an amplitude limitation, and applied to the frequency discriminator DISCR4. Denoting the frequency error detecting sensitivity (V/Hz) of the frequency discriminator 4 by $k_1$, a detection output of $f_{IF}k_1=e_1$ is produced. This output of the frequency discriminator is applied to the signal detector (CD)5 and presence or absence of the desired received signal is judged.

Figure 2:
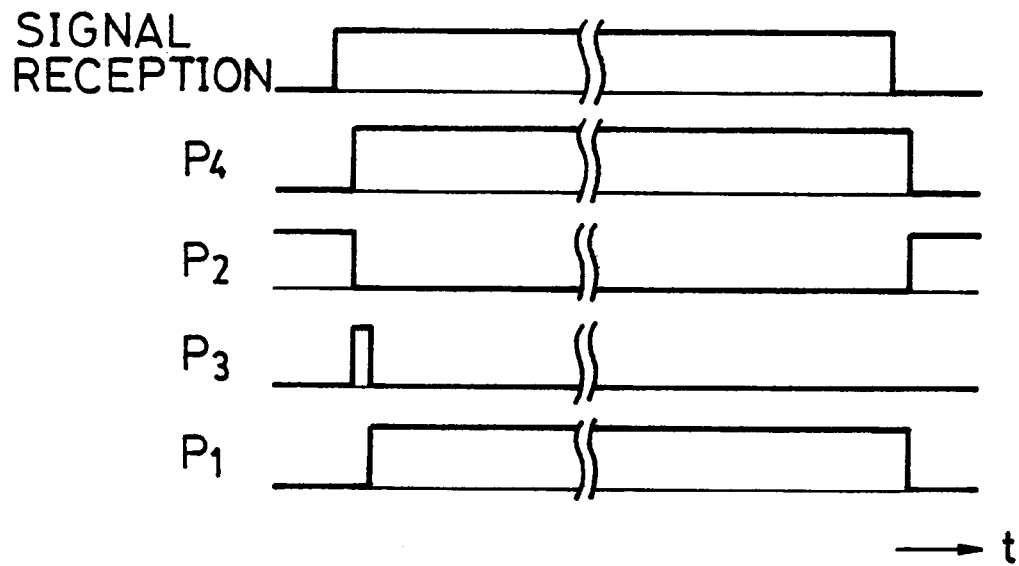
FIG. 2 shows waveforms for explaining operation of the circuit system indicated in FIG. 1.

When presence of the desired received signal is judged by this signal detector 5, a judgment output is produced. The control pulse generator CPG 10 is driven by this output to generate various sorts of control pulses $P_1$ to $P_3$. These control pulses $P_1$ to $P_3$ are outputted through output lines 1, 2 and 3 from the pulse generator, respectively, in a timing relation as indicated in FIG. 2. The overall system is correctly operated, as described below, by controlling different sections by means of these control pulses.

$P_4$ in FIG. 2 shows an output state of the signal detector CD 5, while $P_1$, $P_2$ and $P_3$ show output states in the output lines 1, 2 and 3 from the control pulse generator OPC 10. As clearly seen from the same figure, when no object signal is received, since the level of the output $P_4$ of the signal detector CD 5 is "L" and the level of $P_2$ on the output line 2 is "H", the gate circuit G1 8 is opened. Therefore the scanning voltage from the scanning signal generator SCNG 7 is applied to the voltage controlled oscillator VCO 15 through the gate circuit G1 8 and the loop filter LPF 12 to scan the frequency of the local carrier.

When the IF signal enters a predetermined IF band, after some response time the output of the signal detector CD 5 becomes "H" in the logic level and at the same time the level of the output appearing in the output line from the control pulse generator OPC 10 becomes "L". For this reason the gate circuit G1 8 is closed and the scanning by the voltage controlled oscillator VCO 15 is stopped at that time.

The gate circuit G3 6 is also closed at the same time as the gate circuit G1 8 is closed. The output of the frequency error detector just before the gate circuits are closed, i.e. $e_1$ described above, is taken in the operating OPC 11 through this gate circuit G3 6 and at the same time the driving voltage $e_2$ just before the stop of the scanning applied to the voltage controlled oscillator VCO 15 is also taken in the operating circuit OPC 11 through the gate circuit G5 14.

Figure 3:
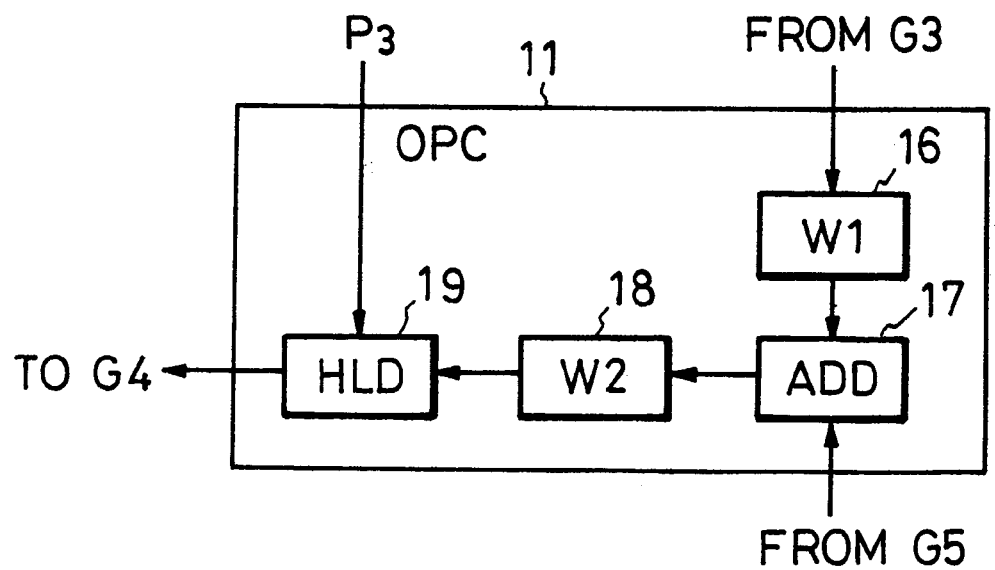
FIG. 3 is a circuit system diagram showing an example of construction of an operating circuit, which is a constituent element in FIG. 1.

The operating circuit OPC 11 executes the above calculation, i.e. $(e_1/k_1k_2k_3)+(e_2/k_3)$ and an example of construction thereof is indicated in FIG. 3. In FIG. 3, 16 is a weighting circuit W1; 17 is an adding circuit ADD; 18 is a weighting circuit W2; and 19 is a holding circuit HLD. The frequency error voltage $e_1$ applied from the gate circuit G3 6 indicated in FIG. 1 is multiplied by a weight of $1/k_1k_2$ by the weighting circuit W1 16 to produce an output voltage of $e_1/k_1k_2$. This voltage is applied to the adding circuit ADD 17, in which $e_2$ is added thereto so that a voltage of $(e_1/k_1k_2)+e_2$ is obtained. This voltage is further multiplied by a weight of $1/k_3$ in the succeeding weighting circuit W2 18. Then this voltage is applied to the holding circuit HLD 19 and held there by the control pulse $P_3$. The output of the holding circuit HLD 19 is applied to the gate circuit G4 13. Since the gate circuit 13 is opened only during the control pulse $P_3$ at that time, the voltage of $(e_1/k_1k_2k_3)+(e_2/k_3)$ is applied to the loop filter LPF12. This loop filter 12 has a gain of $k_3$ and the voltage just before the control pulse $P_2$ falls to the low level "L", i.e. $e_2$, is stored in the filter. Since the voltage of $(e_1/k_1k_2k_3)+(e_2/k_3)$ is applied to the filter through the gate circuit G4 13 by the control pulse $P_3$, the output of the filter is displaced from the voltage of $e_2$ to $(e_1/k_1k_2)+e_2$. In order to effect this displacement of the voltage at a high speed, it is necessary that the output resistance of the holding circuit HLD 18 and the on-resistance of the gate circuit 13 are low.

Owing to the operation described above, the input (driving) voltage of the voltage controlled oscillator VCO 15 is set at $e_2+(e_1/k_1k_2)$ and the output frequency of the VCO 15 is a product thereof multiplied by $k_2$, i.e. $e_2k_2+(e_1/k_1)$.

As described previously, represented in the frequency, this $e_2k_2+(e_1/k_1)$ is $f_{VCO}+f_{IF}$ and this frequency is equal to the frequency $F_{RCV}$ of the object signal. Since, strictly speaking, this frequency is $f_{RCV}k_1k_2k_3/(1+k_1k_2k_3)$, in the IF, a difference between the frequency error $f_{RCV}$ of the received signal and that frequency is $f_{RCV}-(f_{RCV}k_1k_2k_3/(1+k_1k_2k_3))=f_{RCV}/(1+k_1k_2k_3)$. Consequently, in the output $e_1$ of the frequency discriminator, a voltage, which is a product of this frequency multiplied by $k_1$, i.e. $f_{RCV}k_1(1+k_1k_2k_3)=(f_{VCO}+f_{IF})k_1/(1+k_1k_2k_3)$, is produced. Rewriting this output voltage of the discriminator, using the relations $f_{VCO}=e_2k_2$ and $f_{IF}=e_1k_1$, this is $e_2k_1k_2/(1+k_1k_2k_3)+(e_1/(1+k_1k_2k_3))$. When the gate circuit G2 9 is turned-on, this voltage is applied to the loop filter 12. Since the gain thereof is $k_3$, the output of the loop filter is $(e_2k_1k_2k_3/(1+k_1k_2k_3)+(e_1k_3/(1+k_1k_2k_3))\approx e_2+(e_1/k_1k_2)$.

Since this voltage is equal to the setting voltage of the VCO 15 described previously, even if the AFC loop is closed at that time, nothing is changed and it is possible to proceed smoothly to the AFC mode.

As explained in detail in the above, by the AFC circuit for a frequency scanning receiver according to the present invention, since it is possible to set the AFC circuit in a converged state in an extremely short time after an object signal has been caught by scanning, it is possible to shorten a header of a packet signal. Therefore it is possible to improve through-put of data which can be transmitted.

What is claimed is:

1. In an AFC circuit for a frequency scanning receiver comprising a voltage controlled oscillator for generating a frequency scanning signal; a frequency converter for generating a frequency error signal including a frequency error signal obtained from a received signal and said frequency scanning signal; a frequency discriminator for detecting the frequency error signal; and a signal detector for judging presence or absence of a desired received signal in an output of a signal intensity indicator obtained from a detection output of said frequency discriminator or an intermediate frequency amplifier section, which is so constructed that a control voltage is given to said voltage controlled oscillator, depending on a judgment output of said signal detector to stop said frequency scanning;

an operating circuit, which calculates a voltage for setting the frequency at convergence of said AFC circuit, based on said frequency error signal and said control voltage; and control means constituting an AFC loop by applying an output of said operating circuit to said voltage controlled oscillator;

the improvement wherein said operating circuit comprises a first weighting circuit; an adding circuit; a second weighting circuit; and a holding circuit, in which said first weighting circuit weights said frequency error signal at the stop of said frequency scanning with a first weight; said adding circuit adds said control voltage at the stop of said frequency scanning to an output signal of said first weighting circuit; said second weighting circuit weights an output signal of said adding circuit with a second weight; and said holding circuit outputs an output signal of said second weighting circuit after having held it in a predetermined period of time.

* * * * *